United States Patent
Womack et al.

(10) Patent No.: US 8,964,609 B2
(45) Date of Patent: Feb. 24, 2015

(54) SYSTEM AND METHOD FOR COORDINATING HALF-DUPLEX COMMUNICATIONS PROTOCOLS

(75) Inventors: James Womack, Irving, TX (US); Zhijun Cai, Irving, TX (US); Wei Wu, Irving, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 379 days.

(21) Appl. No.: 12/568,375

(22) Filed: Sep. 28, 2009

(65) Prior Publication Data

US 2010/0085901 A1 Apr. 8, 2010

Related U.S. Application Data

(60) Provisional application No. 61/100,500, filed on Sep. 26, 2008.

(51) Int. Cl.
*H04L 5/16* (2006.01)
*H04B 7/26* (2006.01)

(52) U.S. Cl.
CPC .................................. *H04B 7/2656* (2013.01)
USPC .......................................... 370/295; 370/343

(58) Field of Classification Search
USPC ......... 370/229, 232, 254, 277, 295, 296, 310, 370/343
See application file for complete search history.

(56) References Cited

U.S. PATENT DOCUMENTS

| | | | | | |
|---|---|---|---|---|---|
| 5,724,515 | A | * | 3/1998 | Barnes et al. | 709/236 |
| 6,314,082 | B1 | * | 11/2001 | Malmgren | 370/208 |
| 7,321,579 | B2 | * | 1/2008 | Ko | 370/338 |
| 7,639,748 | B2 | * | 12/2009 | Kao | 375/260 |
| 7,986,681 | B2 | * | 7/2011 | Astely et al. | 370/341 |
| 2001/0055296 | A1 | * | 12/2001 | Akiyama | 370/344 |
| 2003/0223354 | A1 | * | 12/2003 | Olszewski | 370/208 |
| 2005/0025042 | A1 | * | 2/2005 | Hadad | 370/208 |
| 2007/0002823 | A1 | * | 1/2007 | Skov Andersen et al. | 370/349 |
| 2008/0081626 | A1 | * | 4/2008 | Choi et al. | 455/442 |
| 2008/0137562 | A1 | * | 6/2008 | Li et al. | 370/280 |
| 2008/0293398 | A1 | * | 11/2008 | Seyama et al. | 455/422.1 |

(Continued)

FOREIGN PATENT DOCUMENTS

| | | |
|---|---|---|
| CN | 1341336 A | 3/2002 |
| CN | 101197615 A | 6/2008 |

(Continued)

OTHER PUBLICATIONS

Notification of Transmittal of International Search Report, International Search Report and Written Opinion for PCT/US2009/058583, mailed Apr. 19, 2010.

(Continued)

*Primary Examiner* — Curtis A Alia

(74) *Attorney, Agent, or Firm* — Conley Rose, P.C.; J. Robert Brown, Jr.

(57) ABSTRACT

The present disclosure is directed to a system and method for operating a user agent (UA) and access device located within a communications cell according to a half-duplex (HD), frequency-division duplexing (FDD) protocol. The system and method are designed to accommodate a guard period (GP) between downlink (DL) and uplink (UL) communications from the UA, while addressing the loss of at least part of the DL communication before a subsequent UL subframe to accommodate the GP.

30 Claims, 7 Drawing Sheets

(56) References Cited

U.S. PATENT DOCUMENTS

| | | | |
|---|---|---|---|
| 2009/0046605 A1* | 2/2009 | Gao et al. | 370/280 |
| 2010/0008317 A1* | 1/2010 | Bhattad et al. | 370/329 |

FOREIGN PATENT DOCUMENTS

| | | | |
|---|---|---|---|
| EP | 1037484 A1 | 9/2000 | |
| WO | WO 2009022294 A2 * | 2/2009 | ............ H04W 72/04 |
| WO | 2009088496 A1 | 7/2009 | |
| WO | 2009090170 A | 7/2009 | |

OTHER PUBLICATIONS

Mitsubishi Electric, IP Wireless: "Idle period and frame designs for half-duplex communications," 3GPP TSG RAN WG1 (online), Oct. 10-Oct. 14, 2005, XP002562208.

Mexican Office Action; Application No. MX/a/2011/003202; Feb. 22, 2012; 6 pages.

Canadian Office Action; Application No. 2,738,279; Jun. 11, 2012; 4 pages.

Korean Office Action; Application No. 10-2011-7009530; Jun. 28, 2012; 6 pages.

3GPP TSG RAN WG2 Meeting #61; "Half Duplex FDD Operation in LTE"; R2-080707; Sorrento, Italy; Feb. 11-15, 2008; 2 pages.

TSG-RAN WG2 Meeting #62; "Impacts of Half-Duplex FDD UE Operation on RAN2 Specifications"; R2-082150; Kansas City, USA; May 5-9, 2008; 7 pages.

3GPP TSG-RAN WG2 Meeting #62; "Support of Half Duplex UEs in MAC"; R2-082200; Kansas City, USA; May 5-9, 2008; 4 pages.

3GPP TS 36.211 V8.7.0; 3rd Generation Partnership Project; Technical Specification Group Radio Access Network; Evolved Universal Terrestrial Radio Access (E-UTRA); Physical Channels and Modulation; Release 8; May 2009; 83 pages.

3GPP TS 36.321 V8.6.0; 3rd Generation Partnership Project; Technical Specification Group Radio Access Network; Evolved Universal Terrestrial Radio Access (E-UTRA) Medium Access Control (MAC) Protocol Specification; Release 8; Jun. 2009; 47 pages.

3GPP TS 36.331 V8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pages.

3GPP TS 36.300 V9.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 9; Jun. 2009; 157 pages.

Canadian Office Action; Application No. 2,738,279; Mar. 20, 2013; 2 pages.

Korean Office Action; Application No. 10-2013-7010731; Aug. 13, 2013; 6 pages.

Japanese Office Action; Application No. 2011-529309; Oct. 1, 2012; 5 pages.

Chinese Office Action; Application No. 200980143490.8; Sep. 10, 2013; 15 pages.

European Extended Search Report; Application No. 11190641.8; Feb. 19, 2013; 7 pages.

Korean Office Action; Application No. 10-2011-7009530; Feb. 27, 2013; 8 pages.

3GPP TSG RAN WG1; "UE-Specific Idle Period for Half-Duplex Communications"; R1-071847; Beijing, China; Apr. 17-20, 2007; 8 pages.

3GPP TSG-RAN WG2 #62; "HD-FDD and TDD Aspects of the Solutions for Subframe Bundling"; R2-082467; Kansas City, U.S.; May 5-9, 2008; 8 pages.

Chinese Office Action as Recieved in Co-pending Application No. 200980143490.8 on May 27, 2014; 7 pages. (No English translation available).

Chinese Office Action as Received in Co-pending Application No. 200980143490.8 on Dec. 9, 2014; 4 pages. (No English translation available).

* cited by examiner

SYSTEM AND METHOD FOR COORDINATING HALF-DUPLEX COMMUNICATIONS PROTOCOLS

CROSS REFERENCE TO RELATED APPLICATIONS

This application is based on, claims the benefit of, and incorporates herein by reference U.S. Provisional patent application Ser. No. 61/100,500 filed on Sep. 26, 2008, and entitled "SYSTEM AND METHOD FOR COORDINATING HALF-DUPLEX COMMUNICATIONS PROTOCOLS".

BACKGROUND

The present disclosure relates generally to data transmission in mobile communication systems and more specifically to methods for coordinating uplink and downlink communications within a half-duplex communications protocol.

As used herein, the terms "user agent" and "UA" can refer to wireless devices such as mobile telephones, personal digital assistants, handheld or laptop computers, and similar devices that have telecommunications capabilities. In some configurations, a UA may refer to a mobile, wireless device. The term "UA" may also refer to devices that have similar capabilities but that are not transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE access device, that can provide a UA with access to other components in a telecommunications system.

In mobile communication systems, such as the enhanced universal terrestrial radio access network (E-UTRAN), the access device provides radio accesses to one or more UAs. The access device includes a packet scheduler for allocating uplink and downlink data transmission resources among all the UAs communicating to the access device. The functions of the scheduler include, among others, dividing the available air interface capacity between the UAs, deciding the resources to be used for each UA's packet data transmission, and monitoring packet allocation and system load. The scheduler allocates physical layer resources for downlink shared channel (DL-SCH) and uplink shared channel (UL-SCH) data transmissions, and sends scheduling information to the UAs through a scheduling channel. The UAs refer to the scheduling information for the timing, frequency, data block size, modulation, and coding of uplink and downlink transmissions.

In the latest versions of LTE equipment, two duplexing modes are supported. The first is referred to as time-division duplexing (TDD). When operating in a TDD mode, a common carrier frequency and bandwidth are used to communicate both uplink (UL) and downlink (DL) communications between the UA and the access device. To separate the UL and DL communications, the use of the band is divided in time. For instance, from the UA's perspective, UL communications are restricted to a particular time and duration followed by a predetermined time and duration for receiving DL communications from the access device. To further protect against inadvertent overlapping of UL and DL communications, a guard period (GP) is often employed between UL and DL communication periods. This process of alternating UL and DL communication periods with interspersed GPs continues throughout the communications cycle.

The second duplexing mode is frequency-division duplexing (FDD). In an FDD implementation, distinct carrier frequencies are used for UL communications and DL communications. Accordingly, FDD provides the advantage over TDD of allowing simultaneous transmission of UL and DL communications. However, this advantage comes at the expense of increased hardware complexity, decreased battery life, and increased use of spectrum.

Within the current version of the LTE equipment, there is a third duplexing mode that provides some of the benefits of TDD and FDD. Half duplex (HD) FDD uses separate and distinct carrier frequencies for UL and DL communications, but the communications between the UA and access device are alternated in a manner similar to TDD. As such, battery life is preserved because simultaneous UL and DL communications are avoided and the carrier frequencies, though separate and distinct, could be relatively close together; and in some cases, the only choice due to the spectrum constraints of certain network operators. Further, communications using HD FDD can avoid expensive and complicated duplexer designs that are required within the radio frequency (RF) systems of the UA and access device.

In addition, the current version of the LTE equipment and associated protocols include a number of constraints within which any HD FDD protocol must operate. Referring now to FIG. 1, the frame structure applicable to HD FDD is illustrated. Within this fixed frame structure, the size of various fields in the time domain are expressed on a number of a time unit $T_s$, which is equal to 1/(15,000*2048) seconds. As illustrated in FIG. 1, DL and UL communications are organized into radio frames 2. Each radio frame 2 is $T_f = 307200 * T_s = 10$ milliseconds (ms) long and includes a plurality of slots 4 of length $T_{slot} = 15360 * T_s = 0.5$ ms, numbered from 0 to 19. A subframe 6 is defined as two consecutive slots where subframe i includes slots 2i and 2i+1. While, as described above, UL and DL communications are separated in the frequency domain, in HD FDD operation using this fixed frame structure, the UA cannot transmit and receive at the same time.

The sub-frames 6 are assigned for UL or DL communication dynamically as a result of the above-described scheduler operation. The UA assumes that any sub-frame 6 not otherwise required for transmission of UL transmission may contain a physical downlink control channel (PDCCH) for assignments of UL and/or DL grants.

When switching between UL transmission and DL reception, the necessary switching time is dictated by the access device. However, when switching between DL reception and UL transmission, the GP is provided at the end of the downlink sub-frame. Thus, for HD FDD operation, the GP is created by the UA by not receiving the last part of a DL subframe immediately preceding an UL subframe from the same UA. Hence, while the length of the reserved period is adjustable with symbol-level granularity and may be cell-specific or associated with the UA-specific timing advance value, the UA will forego receiving at least part of the last DL subframe before a subsequent UL subframe in order to accommodate the GP.

Therefore, it would be desirable to have a system and method to accommodate the GP required to implement HD FDD within the current LTE equipment and associated protocols while addressing the required loss of at least part of the last DL subframe before a subsequent UL subframe to accommodate the GP.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
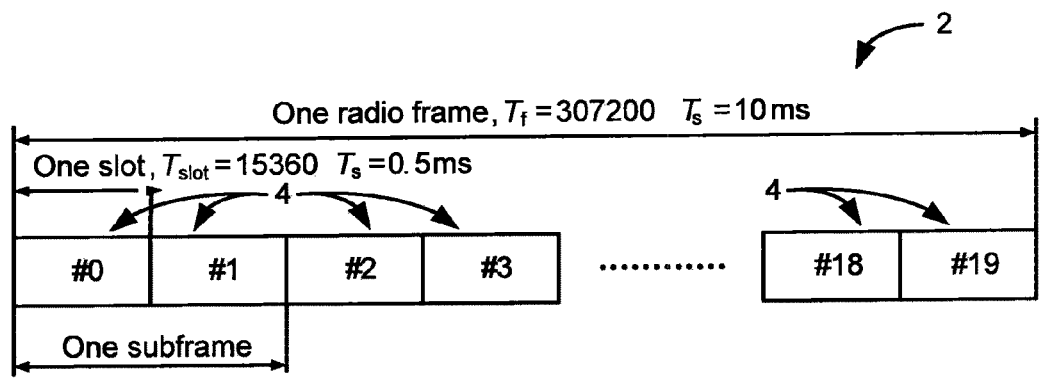
FIG. 1 is a diagram of a frame structure applicable to HD FDD within the current LTE equipment and associated protocols.

The present disclosure overcomes the aforementioned drawbacks by providing a system and method for operating a user agent (UA) and access device located within a communications cell according to a half-duplex (HD), frequency-division duplexing (FDD) protocol.

The method may include operating the UA to receive three downlink (DL) subframes from the access device and inject a guard period (GP) during receipt of a fourth DL subframe from the access device that is substantially matched to a propagation delay associated with the transmission of the fourth DL subframe from the access device to the UA. Also, the method includes operating the UA to process data contained in the three DL subframes and the fourth DL subframe substantially similarly. The processing of data by the UA in the fourth subframe may include attempting to sequentially demodulate individual symbols in the data to identify control symbols and disregard non-control symbols.

Furthermore, the method may include operating the UA to receive three downlink (DL) subframes from the access device and inject a guard period (GP) during a period scheduled for receipt of a fourth DL subframe from the access device. The method also includes operating the UA to process data contained in only the three DL subframes. To this end, the UA may not receive the fourth DL subframe and following the GP, the UA may transmit three uplink (UL) subframes to the access device and not send any data during a period scheduled for a fourth UL subframe.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 2:
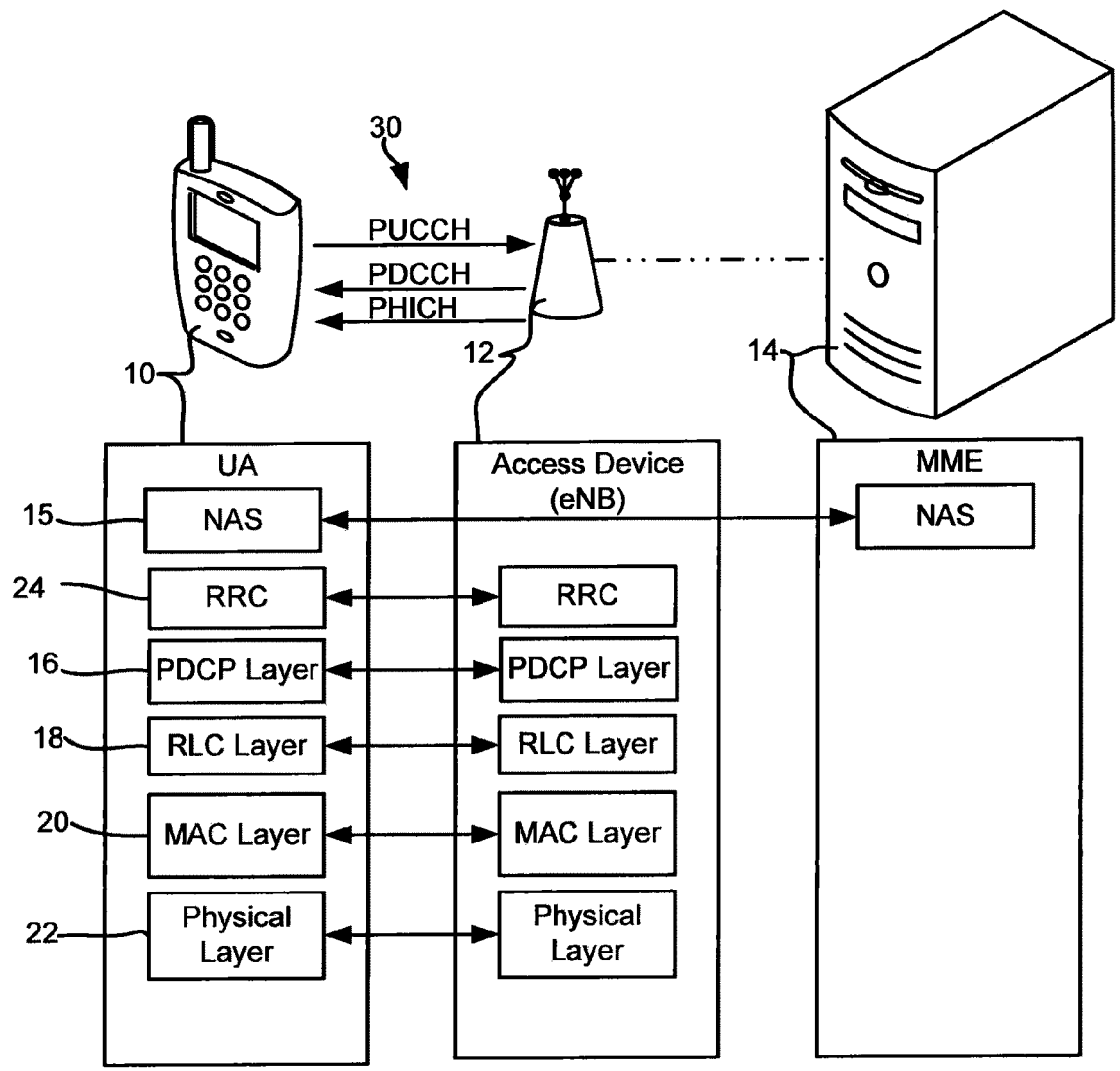
FIG. 2 is a is a diagram of a wireless communications system including a user agent (UA), an access device, and a mobility management entity (MME) configured to implement an HD FDD process and GP handling protocol.

Referring now to the drawings wherein like reference numerals correspond to similar elements throughout the several views and, more specifically, referring to FIG. 2, a block diagram illustrating a long-term evolution (LTE) control plane protocol stack is shown. A UA 10 communicates with both an access device 12, such as an evolved Node B, and a mobility management entity (MME) 14. Various layers are illustrated in the control plane protocol stack. A non-access stratum (NAS) layer 15 may handle mobility and session management. A packet data convergence protocol (PDCP) layer 16 is illustrated both on the UA 10 and on the access device 12. The PDCP layer 16 performs internet protocol (IP)

header compression and decompression, encryption of user data, transfer of user data, and maintenance of sequence numbers (SN) for radio bearers.

Below the PDCP layer 16 is a radio link control (RLC) protocol layer 18 that communicates with the radio link control protocol layer on the access device 12. As will be appreciated, communication occurs through the physical layer in protocol stacks such as those illustrated in FIG. 2. However, RLC-protocol data units (PDUs) from the RLC layer 18 of the UA are interpreted by the RLC layer on the access device 12. Below the RLC layer 18 is a medium access control (MAC) data communication protocol layer 20. As will be appreciated by those skilled in the art, the RLC and MAC protocols form the data link sub-layers of the LTE radio interface and reside on the access device 12 and on the UA 10 in LTE. Layer 1 (L1) LTE, which is referred to as the physical layer 22, is below the RLC/MAC layers 18 and 20 and, as the label implies, is the physical layer for communications.

Referring still to FIG. 2, the control plane includes a radio resource control (RRC) protocol layer 24 that is the part of the protocol stack that is responsible for the assignment, configuration, and release of radio resources between the UA 10 and the access device 12. Basic functionalities of RRC protocol for LTE are described in 3GPP TR36.300 and TS36.331 and incorporated herein by reference.

The access device 12 hosts a number of functions. For example, the access device 12 hosts radio resource management, including radio bearer control, radio admission control, connection mobility control, dynamic allocation of resources to UAs in both UL and DL scheduling. The access device 12 also hosts IP header compression and encryption of user data stream, selection of an MME at UA attachment, routing of user plane data towards serving gateway, scheduling and transmission of paging messages (originated from the MME), scheduling and transmission of broadcast information, and measurement and measurement reporting configuration for mobility and scheduling.

The MME 14 also hosts a number of functions, including distribution of paging messages to the access devices 12, security control, idle state mobility control, Evolved Packet Core (EPC) bearer control, and ciphering and integrity protection of Non-Access Stratum (NAS) signaling.

Figure 3:
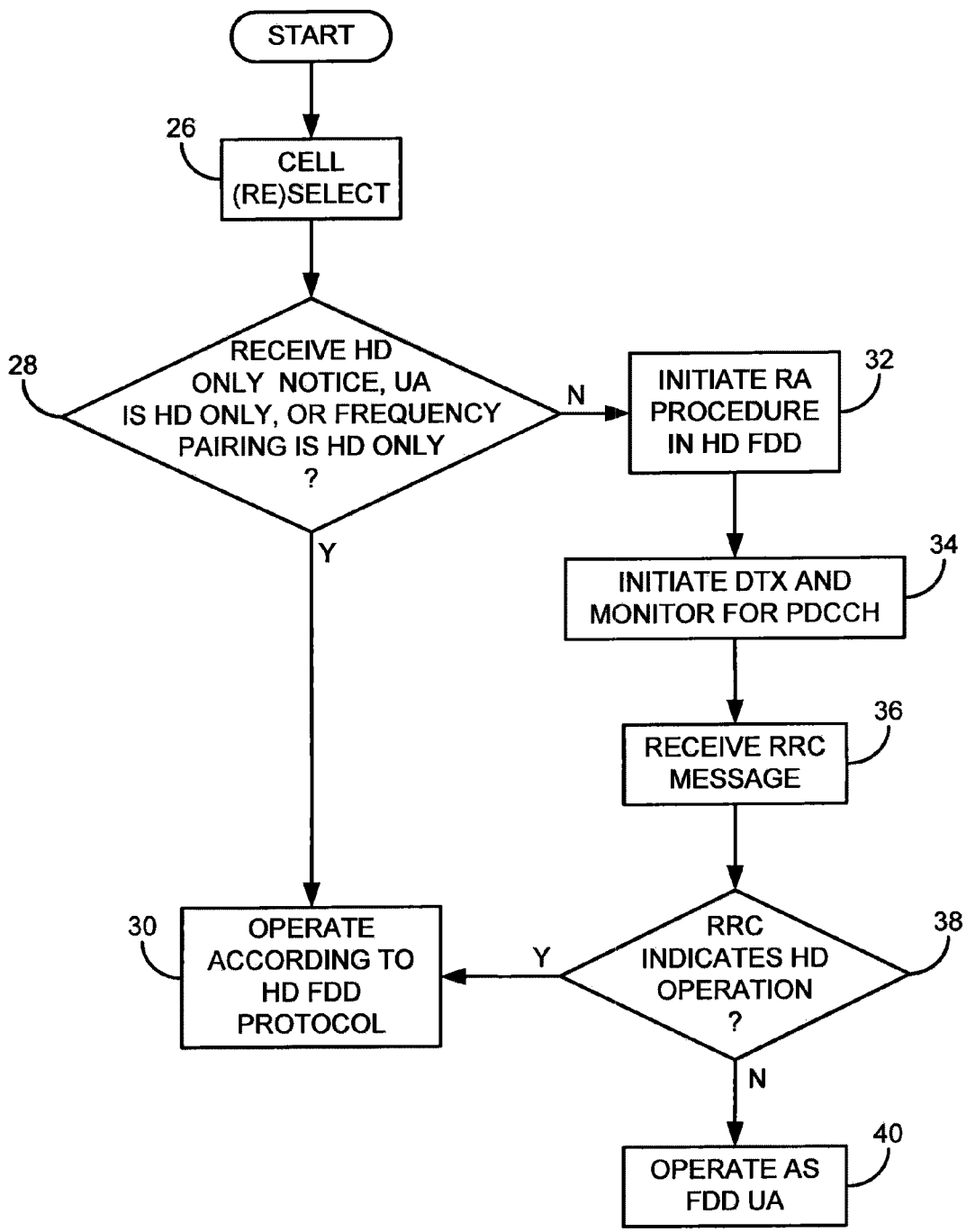
FIG. 3 is a flow chart setting forth the steps of a process for entering an HD FDD protocol.

Referring now to FIG. 3, an exemplary communications protocol between a UA 10 and an access device 12 for determining a duplexing method is illustrated. The process begins at process block 26, when the UA enters or becomes active within a given cell. Initially, at decision block 28, the UA and/or access device looks for one of a number of potential indicators that HD FDD protocol can or should be utilized. First, the UA may receive a notice from the access device within the cell in response indicating that the cell requires HD FDD operation. Second, the UA may only be configured to perform HD FDD and, thus, indicates such to the access device. Finally, the UA may determine from the frequency pairings for the UL and DL communications that, due to the close proximity of the frequencies, HD FDD is required within the cell. If any of these determinations is made at decision block 28, at process block 30, the UA and access device operate according to one of the HD FDD protocols that will be described in detail below.

If no determination is made at decision block 28, a random access (RA) procedure is initiated in the HD FDD protocol at process block 32. Thereafter, the UA enters a discontinuous transmission (DTX) mode and monitors for a physical DL control channel (PDCCH) communication from the access device, which carries the UL scheduling grant. It should be noted that the UA is advantageously able to extend its battery service life as directed by the access device or though implementing its own sleep mode decisions, such as a discontinuous reception (DRX) and DTX mode because certain components can be placed in a sleep mode when reception/transmission is not scheduled.

When the PDCCH is received, the UA has the UL scheduling grant and, at process block 36, awaits the radio resource control (RRC) communication, which among many other things, may include an indication that duplexing within the cell should operate according to the HD FDD protocol. At decision bock 38, if the RRC indicates that operation within the cell should be according to HD FDD operation, at process block 30, the UA begins operation accordingly. However, if at decision block 38, the RRC does not indicate HD operation should be used within the cell, at process block 40, the UA operates according to standard, non-HD, FDD operation.

Figure 4:
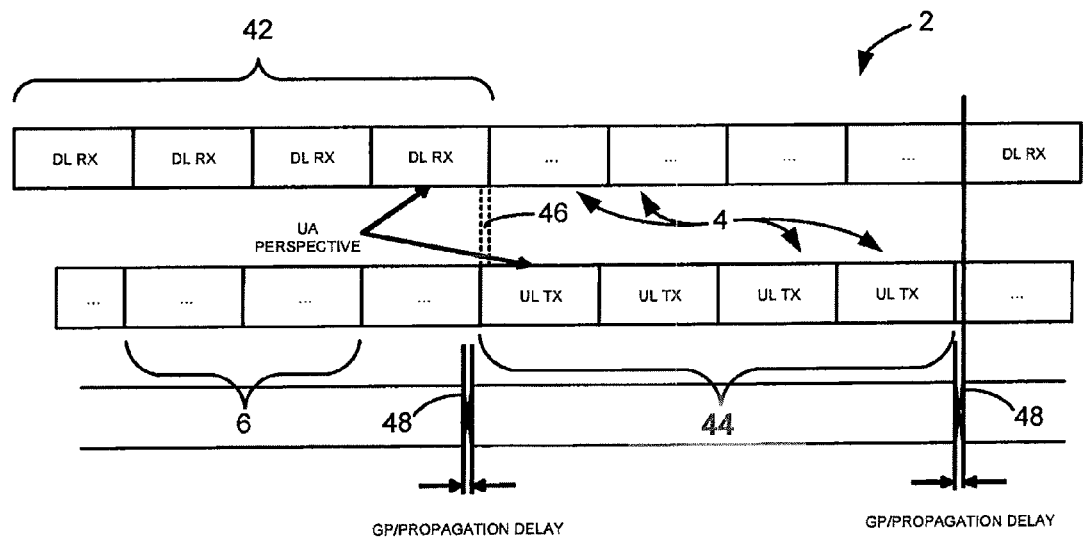
FIG. 4 is a diagram of the frame structure and a GP handling protocol.

As described above, in current LTE equipment and associated protocols, a GP is used during HD FDD at changes between UL communications and DL communications. Referring to FIG. 4, one method for handling the GP is illustrated that is designed to attempt to process all DL receptions despite any losses caused by the GP. It should be noted that FIG. 4 refers to UL transmission and DL receptions from the UA's prospective.

As described above with respect to FIG. 1, within this frame structure, the size of various fields in the time domain is expressed as a number of time units $T_s$, which is equal to $1/(15,000*2048)$ seconds. The DL and UL communications are organized into radio frames 2 that are $T_f=307200*T_s=10$ milliseconds (ms) long and includes twenty slots 4 having a length of $T_{slot}=15360*T_s=0.5$ ms. The subframe 6 is defined as two consecutive slots where subframe i includes slots $2i$ and $2i+1$.

Some equipment and associated protocol use a fixed operation pattern to simplify the scheduling complexity and avoid potential conflicts of DL receive and UL transmit activities. With the fixed pattern, hybrid automatic repeat request (HARQ) operation of HD UAs is governed by a specified cycle of four DL subframes 42 followed by four UL subframes 44. The four-by-four structure is imposed primarily for HARQ feedback. As will be described below, there is an offset 46 between the UL and DL subframes and a GP 48 as described above.

While, as also described above, UL and DL transmissions are separated in the frequency domain, in HD FDD operation, the UA cannot transmit and receive at the same time. Transmission of the uplink radio frame number i from the UA shall start after the offset 46, which is $(N_{TA}+N_{Taoffset})*T_s$ seconds before the start of the corresponding downlink radio frame at the UA. For example, $N_{TA}$ and $N_{TA\ offset}$ may be equal to 614 and 0, respectively, for HD FDD. Accordingly, by this convention, the GP is approximately 20 µs plus any propagation delay. However, in accordance with this disclosure, it is contemplated that the GP may be further reduced to only the amount of any propagation delay.

In order to do so, the UL and DL propagation delays are aligned with the GPs at the end of the fourth UL transmission subframe and the GPs are reduced to match the UL and DL propagation delays. In this case, the GPs are reduced to the physical minimum possible and only the last part of the receive subframe is lost.

Considering, for example, a cell having a diameter that is a single kilometer. The propagation delay will be 1000 meters divided by $3\times10^8$ or 3.3 microseconds in one direction. An orthogonal frequency division multiplexing (OFDM) symbol, which are the multiple subcarriers that represent the modulated symbols, in the current LTE standard is 0.001 divided by 14, or 71.4 microseconds long. Hence, only 71.4 less 6.6, or 64.8 microseconds, of the last OFDM symbol remains due to the minimized GP. This reduces the link performance for that symbol of the last subframe and the longer the propagation delay, the more degradation will occur.

It is contemplated that there may be situations where this level of degradation is acceptable. If so, the last symbol can be readily processed as normal. If it is not, a more conservative modulation and coding scheme (MCS) may be used by the access device for the resource blocks transmitted in the last transmit subframe. Alternatively, a new physical resource block having a smaller transport block size that does not fill the last OFDM symbol may be created.

Also, it should be noted that in light UL load conditions and in cases where the UA does not have to respond with an UL acknowledgement (ACK)/negative ACK (NACK), it may monitor through to the end of the fourth receive subframe if it does not have to transmit on the uplink in the first uplink subframe. Accordingly, the UA can receive the entire physical resource block(s) and not lose the last OFDM symbol or two or more. This allows for two techniques. First, the access device will not send on the fourth subframe conservatively and the UA will try to transmit in the UL transmit second subframe as much as possible and the access device will try to schedule in the second UL transmit subframe as much as possible. Second, the access device will send conservatively and there may be a slight capacity loss.

While designs with two oscillators may be considered, such configurations would add a small cost and more significant battery consumption. Accordingly, some hardware configurations for UAs may include only one duplexer and one oscillator that are shared for UL transmissions and DL receptions. In this case, a switch is used to selectively connect the duplexer and oscillator to either the UL hardware or the DL hardware. It should be noted that this configuration allows for significant battery savings. Specifically, the transmitter and receiver must be on at the transition from DL receive to UL transmit so that their switching doesn't contribute to the size of the guard band; however, one or the other can be turned off for the majority of the four subframe period.

In such a configuration, a switching time of approximately 100 μs would be imposed by the hardware to allow for a single oscillator to change frequencies and its phase locked loop (PLL) to settle to a new operating frequency. Hence, it may be advantageous in some settings for the GP to be a time period of between 100 μs and 120 μs plus any propagation delay to accommodate propagation and switching delays. In fact, this process can be carried forward to the loss of two of the last symbols and on from there; and becomes more feasible as other factors such as oscillator switching times start adding to the GP.

In addition, the above-described GP minimized protocol allows for significant throughput. Specifically, data can be received and transmitted 50 percent of the time; however, if the last DL OFDM symbols are lost, there will be a slight throughput degradation.

As described above, there may be reasons that the GP cannot be reduced to its minimum, which is the duration of propagation delay within the cell. As the GP grows to accommodate delays associated with switching and the like, the PDSCH of the fourth subframe starts to dwindle. In some configurations, it is contemplated that the PDSCH may not be processed and the UA will only focus on the control portions of the subframe. Specifically, the UA knows that the first several OFDM symbols (for example, first 3 OFDM symbols) may be used for PDCCH transmissions and there are two ways that they can be processed. One way is for the UA to process each symbol as it arrives and follow the steps in FIG. 4. As the UA decodes, it will only be looking to receive the PDCCH UL grant (DCI Format 0), PUCCH/PUSCH power control (DCI Format 3), physical HARQ indicator channel (PHICH), and physical control format indicator channel (PCFICH).

The PHICH is used for monitoring the UL transmission success and PCFICH is needed to know if there are two or three symbols to be used for control portion in the downlink subframe. Since the PDSCH may be abandoned, the PDCCH will only carry information needed for UL transmissions. This means only power control and UL grant information will be conveyed.

Figure 5:
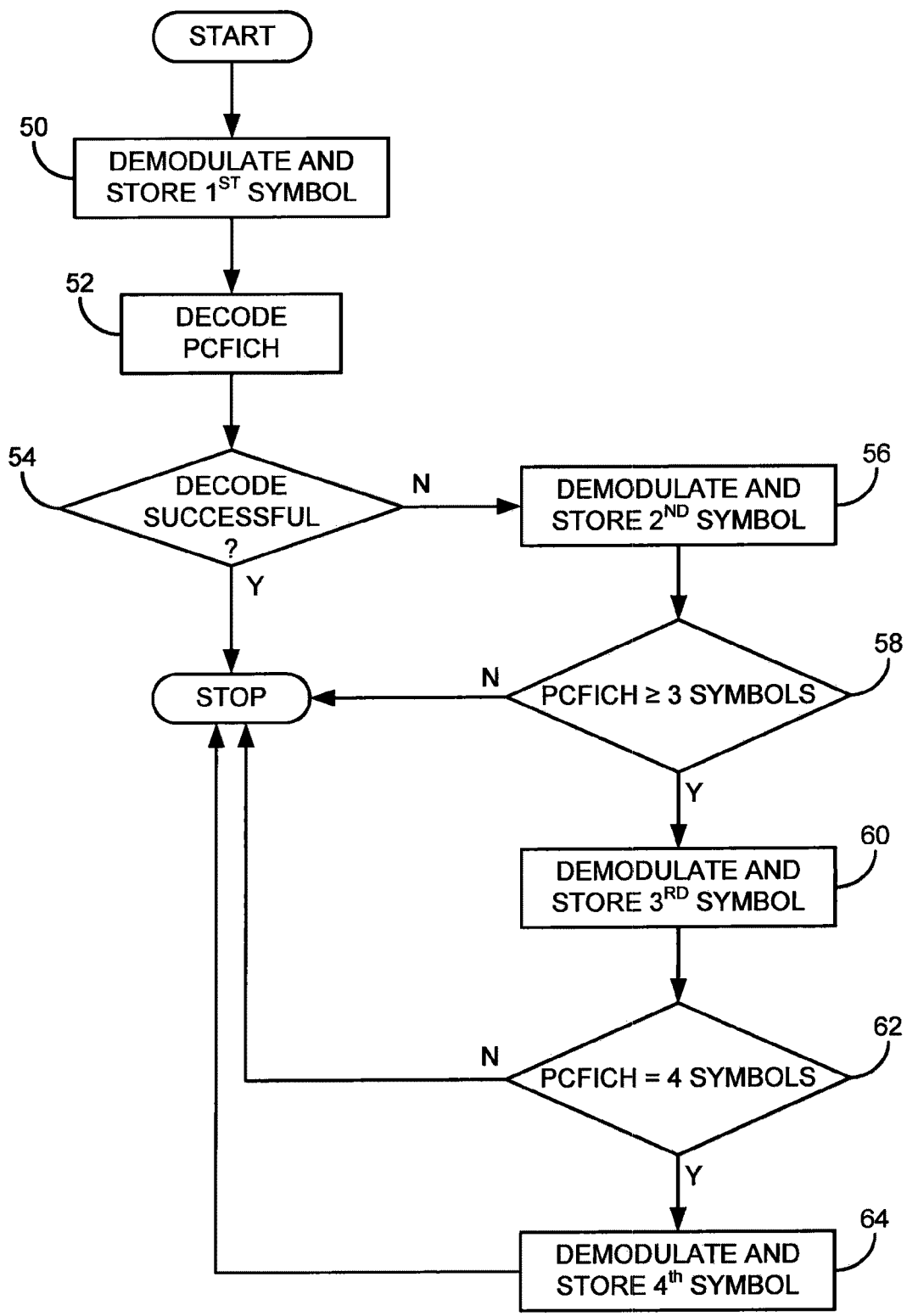
FIG. 5 is a flow chart setting forth the steps of a method for communicating using the frame structure and GP handling protocol illustrated in FIG. 5.

Referring to FIG. 5, such a process begins with the UA receiving and demodulating the first DL symbol at process block 50. The first DL symbol contains the two-bit PCFICH that has the information on the number of symbols (two through four) that are going to be used for control channel information. Hence, upon receipt of the first symbol, the UA decodes the PCFICH at process block 52. Thereafter, the UA checks whether the decode was successful at decision block 54. It is contemplated that the UA may read the first four symbols, decode the PCFICH, determine the control data configuration, and decode the data accordingly. Another option is for the UA to read the first DL receive symbol and decode the PCFICH. It will then know how many total symbols will be in the PDCCH. However, if the UA cannot decode the PCFICH, it drops or does not attempt to decode the entire subframe. If the PCFICH can be decoded, a process similar to that illustrated in FIG. 5 can then be followed by determining if two, three, or four symbols are part of the control data.

At process block 56, the UA demodulates and stores the second symbol, then checks if the PCFICH was greater than or equal to three symbols at decision block 58. If two symbols are needed, then the third and fourth are discarded and the remaining ones are interpreted as normal. If three or more symbols are needed, the third symbol is demodulated and stored at process block 60. At decision block 62, the UA checks whether the PCIFCH is equal to four symbols. If not, the fourth symbol is discarded. However, if the PCFICH is equal to four symbols, the fourth symbol is demodulated and stored at process block 64.

Hence, the above-described process provides the advantage of saving energy of demodulating the third or fourth symbols in some instances. While this scheme operates such that the percentage of DL on-time will be 50 percent, only three out of eight subframes can be used for receiving DL transmissions. Accordingly, 37.5 percent of the available time can be used for receiving user data in the DL, which is less than the 50 percent achieved with the GP-minimized method described with respect to FIG. 4.

Figure 6:
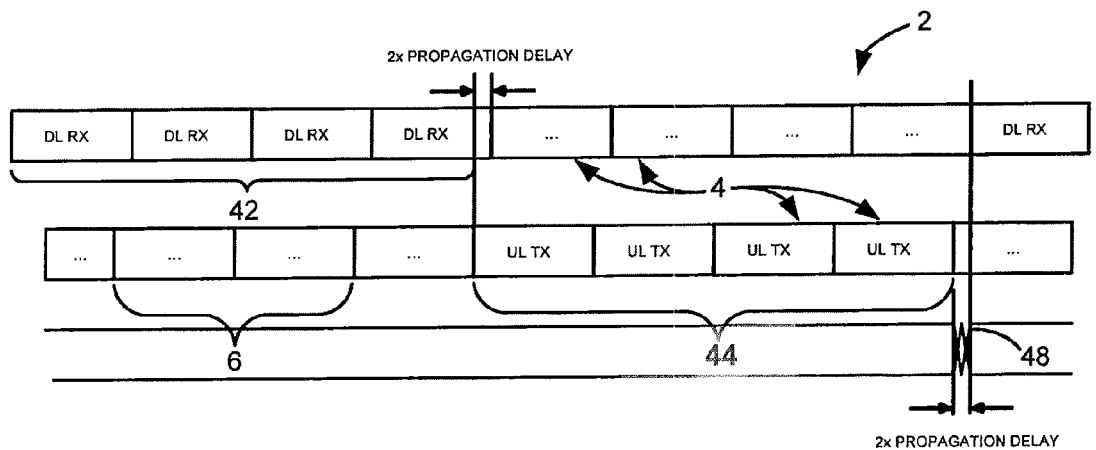
FIG. 6 is a diagram of the frame structure and another GP handling protocol.

Beyond the above-mentioned processes, it is contemplated that the four-by-four HD operating pattern can be modified to operate in a three-by-three operating pattern. Referring to FIG. 6, the fixed four-by-four pattern can be modified to operate as a three-by-three pattern by abandoning the information in the fourth subframe of each UL four-subframe set 44 or DL four-subframe set 42. Hence, only three subframes for DL receive and UL transmit are used, which maintains symmetry. Furthermore, the three-by-three pattern can be readily implemented while staying within the HARQ procedure specified in the current LTE equipment and associated protocols.

The three-by-three frame structure provides a large gap within which to physically accommodate the DL receive to UL transmit GPs. It is also more energy efficient than the previously-described methods. However, it is noted that the DL receive and UL transmit bandwidth is reduced to be $\frac{3}{7}^{th}$, or 43 percent of the possible total bandwidth available. This means a loss of 7 percent for UL transmit when compared to the method described with respect to FIG. 4, but a gain of 5.5 percent for DL receive over the method described with respect to FIG. 5.

Figure 7:
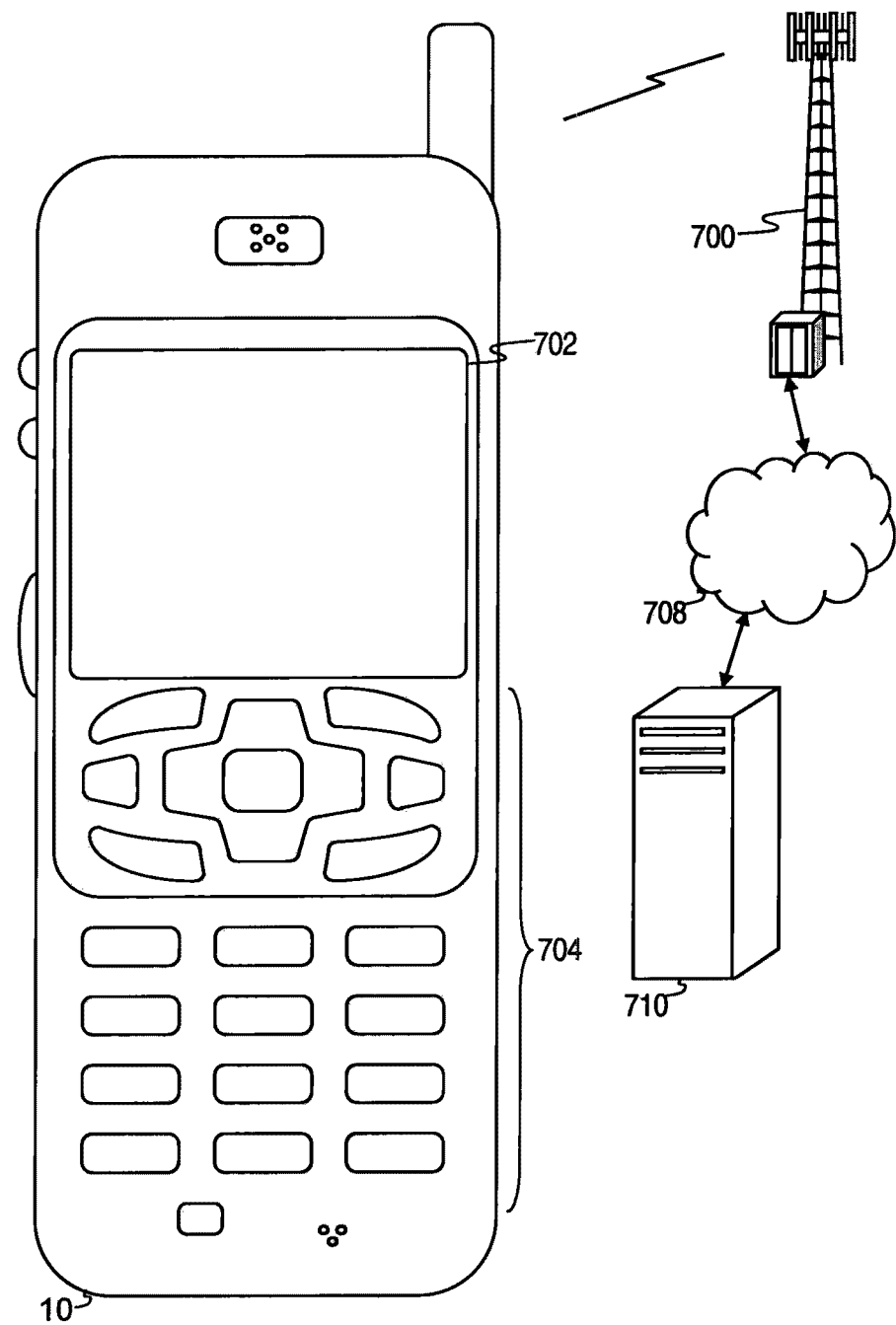
FIG. 7 is a diagram of a wireless communications system including a user agent operable with some of the various configurations described in the disclosure.

Referring now to FIG. 7, a wireless communications system including an embodiment of the UA 10 is illustrated. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 is a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
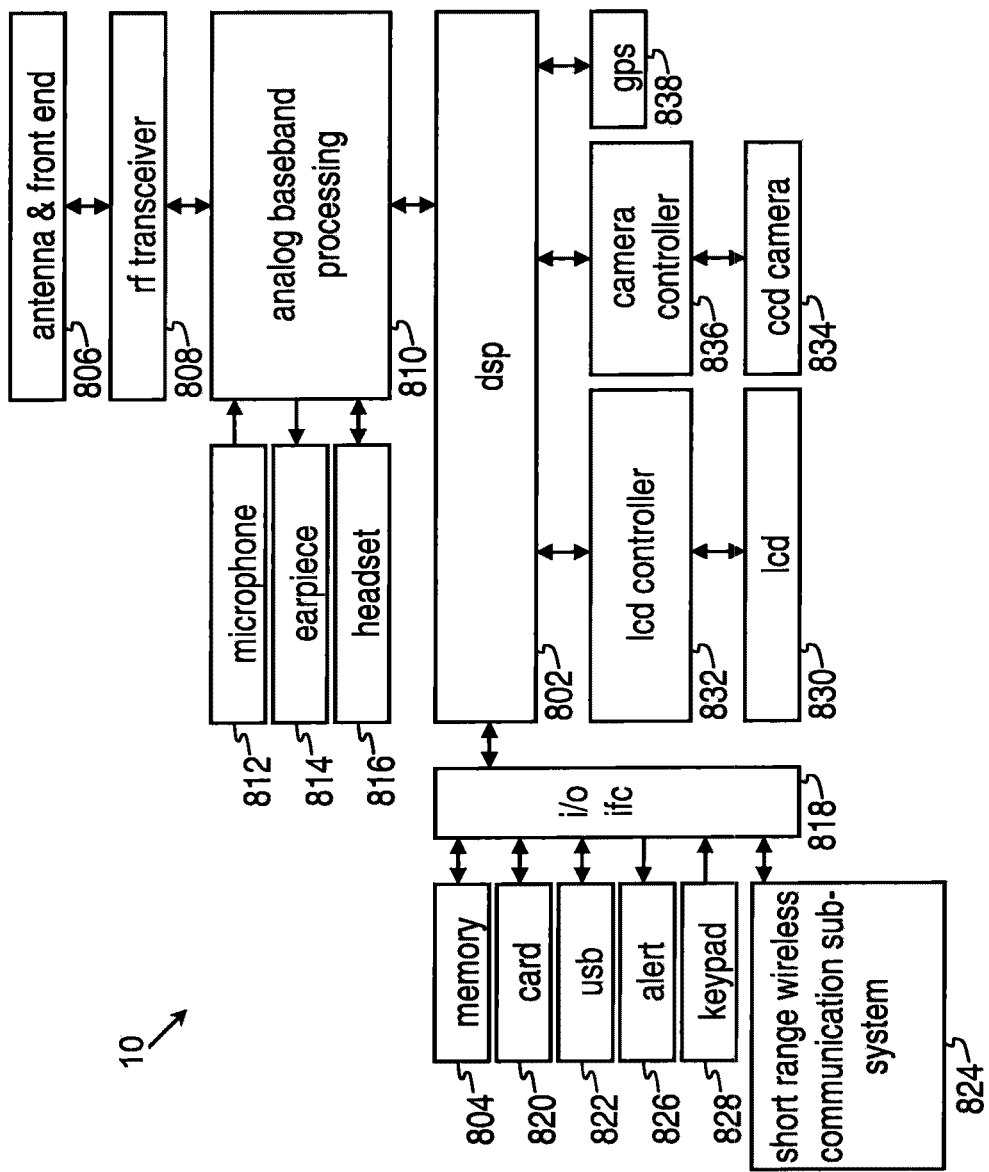
FIG. 8 is a block schematic of a user agent operable with some of the various configurations described in the disclosure.

FIG. 8 shows a block diagram of the UA 10. While a variety of known components of UAs 10 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
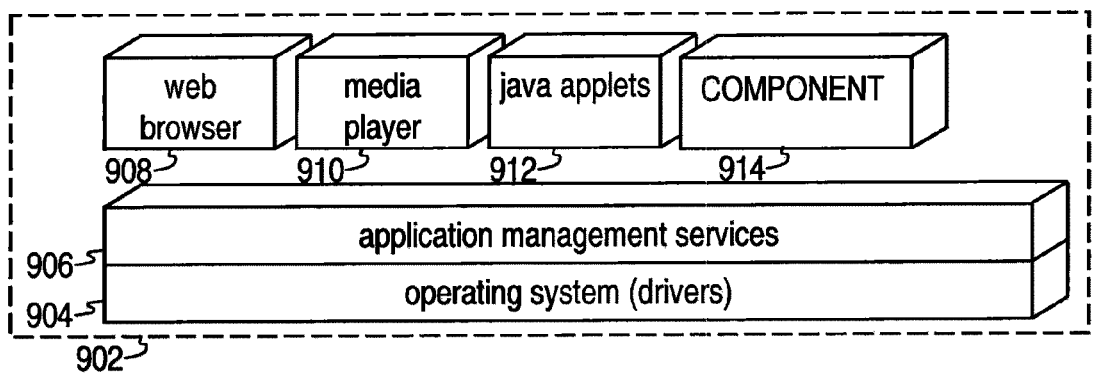
FIG. 9 is a diagram of a software environment that may be implemented on a user agent operable with some of the various configurations described in the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 9 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 10:
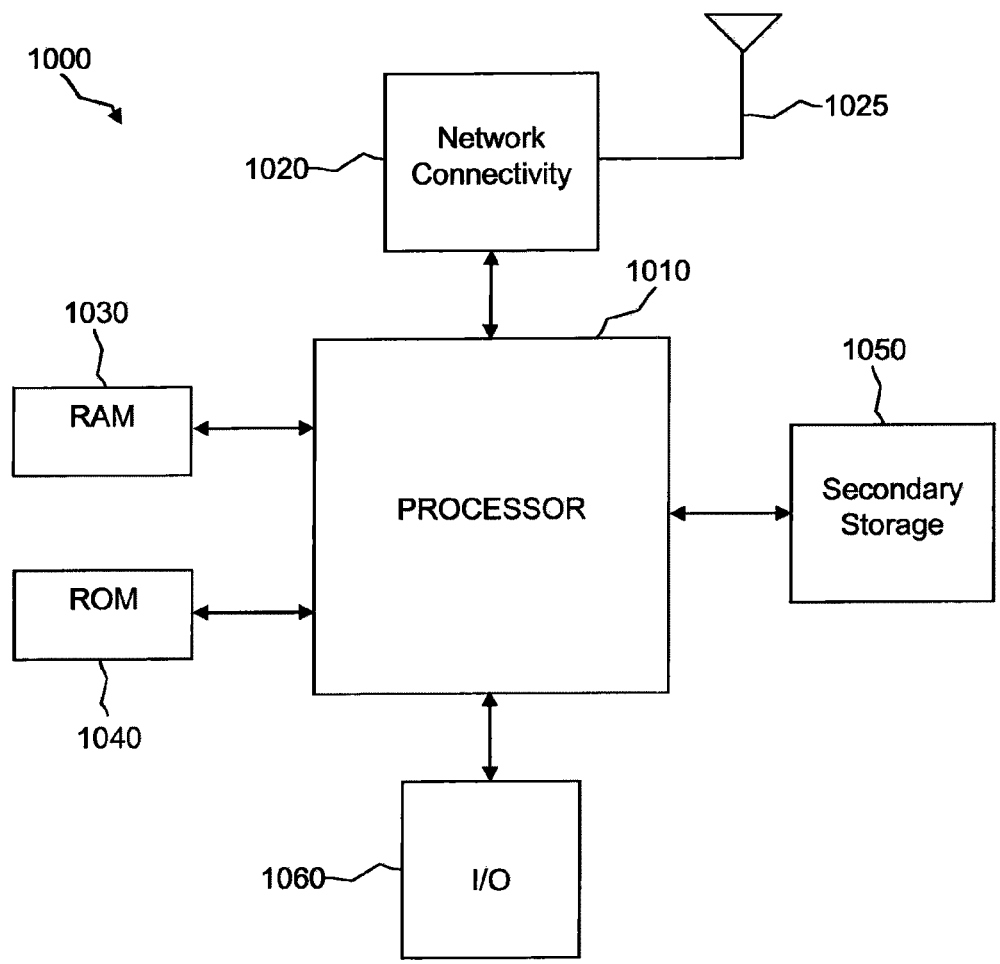
FIG. 10 is an illustrative general purpose computer system suitable for some of the various embodiments of the disclosure.

The UA 10, access device 12, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embodied in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A method for operating a user agent (UA) to communicate with an access device according to a half-duplex (HD), frequency-division duplexing (FDD) protocol, the method comprising:
   receiving and sending a plurality of downlink (DL) and uplink (UL) subframes, respectively, the plurality of DL and UL subframes comprising an equal number of DL and UL subframes;
   determining a guard period (GP) during receipt of the plurality of DL and UL subframes, the GP based on DL and UL propagation delays associated with the plurality of DL and UL subframes;
   aligning and injecting the GP in the last subframe of the plurality of DL and UL subframes,
   wherein DL reception is separated from UL transmission in a frequency domain and wherein a percentage of available time for the DL reception is less than 50 percent caused by injecting the GP.

2. The method of claim 1, further comprising processing data contained in each DL subframe of the plurality of subframes substantially similarly,
   wherein processing the data includes attempting to sequentially demodulate individual symbols in the data to identify control symbols and wherein non-control symbols are disregarded.

3. The method of claim 1, wherein the GP is aligned at the end of a fourth UL transmission subframe and is reduced to match the UL and DL propagation delays.

4. The method of claim 1, further comprising, periodically foregoing the injection of a GP in a DL subframe and continuing to monitor for transmissions from the access device following a fourth DL subframe in the plurality of DL and UL subframes.

5. The method of claim 4, wherein foregoing the injection of the GP is performed when the UA has less data to transmit to the access device than the number of impending UL subframes can hold.

6. The method of claim 5, further comprising, transmitting the data after an end of a first UL subframe in a series of UL subframes.

7. The method of claim 1, wherein the GP is further based on at least an oscillator switching delay.

8. The method of claim 1, further comprising processing data contained in each DL subframe of the plurality of subframes substantially similarly,
wherein processing the data includes attempting to sequentially demodulate individual symbols in the data to identify control symbols and only process control symbols.

9. The method of claim 1, wherein upon receiving a DL subframe, the UA attempts to decode a physical control format indicator channel (PCFICH) and only demodulates the following OFDM symbols in the DL subframe if the PCFICH indicates that demodulation is desirable.

10. A method for operating a user agent (UA) to communicate with an access device according to a half-duplex (HD), frequency-division duplexing (FDD) protocol, the method comprising:
receiving three downlink (DL) subframes from the access device;
injecting a guard period (GP) during a period scheduled for receipt of a fourth DL subframe from the access device, wherein the GP is based on a propagation delay associated with the DL and a propagation delay associated with an uplink (UL); and
processing data contained in only the three DL subframes responsive to injecting the GP, such that energy that would be required to process data contained in the fourth DL subframe is saved,
wherein DL reception is separated from UL transmission in a frequency domain and wherein a percentage of available time for the DL reception is less than 50 percent caused by injecting the GP.

11. The method of claim 10, wherein the fourth DL subframe is not received by the UA.

12. The method of claim 10, further comprising, following the GP, transmitting three uplink (UL) subframes to the access device and sending no data during a period scheduled for a fourth UL subframe.

13. The method of claim 10, wherein the GP is matched to a propagation delay associated with the transmission of a subsequent DL subframe from the access device to the UA plus at least an oscillator switching delay.

14. The method of claim 10, wherein upon receiving a first DL subframe, the UA attempts to decode a physical control format indicator channel (PCFICH) and, if the PCFICH cannot be decoded, the first DL subframe is dropped.

15. The method of claim 10, wherein upon receiving a DL subframe, the UA attempts to decode a physical control format indicator channel (PCFICH) and only demodulates the following symbols in the DL subframe if the PCFICH indicates that demodulation is desirable.

16. The method of claim 10, wherein only three of a four-by-four half duplexing operating pattern are utilized for UL and DL communications.

17. The method of claim 10, wherein processing the data includes attempting to sequentially demodulate individual symbols in the data to identify control symbols and wherein non-control symbols are disregarded.

18. The method of claim 10, wherein the GP is aligned at the end of a fourth UL transmission subframe, and the GP is reduced to match the UL and DL propagation delays.

19. The method of claim 10, wherein a duration of the GP is substantially matched to a propagation delay associated with the transmission of a subsequent DL subframe from the access device to the UA.

20. A user agent (UA) configured to communicate with an access device according to a half-duplex (HD), frequency-division duplexing (FDD) protocol, comprising:
a memory comprising instructions; and
a processor;
wherein, when executed by the processor, the instructions cause the UA to:
receive and send a plurality of downlink (DL) and uplink (UL), subframes, respectively, the plurality of DL and UL subframes comprising an equal number of DL and UL subframes;
determine a guard period (GP) during receipt of the plurality of DL and UL subframes, the GP based on (DL)and (UL)propagation delays associated with the plurality of DL and UL subframes;
align and inject the GP in the last subframe of the plurality of DL and UL subframes,
wherein DL reception is separated from UL transmission in a frequency domain and wherein a percentage of available time for the DL reception is less than 50 percent caused by injecting the GP.

21. The UA of claim 20, wherein the processor configured to receive the plurality of subframes is further configured to attempt to sequentially demodulate individual symbols in data contained in the received plurality of DL subframes to identify control symbols and wherein non-control symbols are disregarded.

22. The UA of claim 20, wherein the GP is aligned at the end of a fourth UL transmission subframe and is reduced to match the UL and DL propagation delays.

23. The UA of claim 20, wherein the processor is further configured to periodically forego the injection of a GP in a DL subframe and continues to monitor for transmissions from the access device following a fourth DL subframe in the plurality of subframes.

24. The UA of claim 23, wherein foregoing the injection of the GP is performed when the UA has less data to transmit to the access device than the number of impending UL subframes can hold.

25. The UA of claim 20, wherein the GP is further based on at least an oscillator switching delay.

26. A user agent (UA) configured to communicate with an access device according to a half-duplex (HD), frequency-division duplexing (FDD) protocol, comprising:
a memory comprising instructions; and
a processor;
wherein, when executed by the processor, the instructions cause the UA to:
receive three downlink (DL) subframes from the access device;
inject a guard period (GP) during a period scheduled for receipt of a fourth DL subframe from the access device, wherein the GP is based on a propagation delay associated with the DL and a propagation delay associated with an uplink (UL); and
process data contained in only the three DL subframes responsive to injecting the GP, such that energy that would be required to process data contained in the fourth DL subframe is saved,
wherein DL reception is separated from UL transmission in a frequency domain and wherein a percentage of available time for the DL reception is less than 50 percent caused by injecting the GP.

27. The UA of claim 26, wherein the fourth DL subframe is not received by the UA.

28. The UA of claim 26, wherein, following the GP, the processor is configured to transmit three uplink (UL) subframes to the access device and send no data during a period scheduled for a fourth UL subframe.

29. The UA of claim 26, wherein the GP is matched to a propagation delay associated with the transmission of a DL subframe from the access device to the UA plus at least an oscillator switching delay.

30. The UA of claim 26, wherein, upon receiving a first DL subframe, the processor is further configured to attempt to decode a physical control format indicator channel (PCFICH) and, if the PCFICH cannot be decoded, drop the first DL subframe.

* * * * *